April 15, 1947.                 O. E. DOW                 2,419,126
HIGH FREQUENCY WAVE METER
Filed July 25, 1942                        2 Sheets-Sheet 2
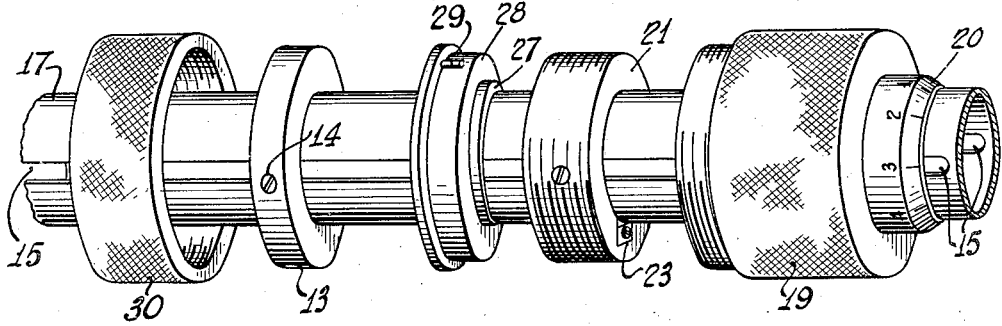
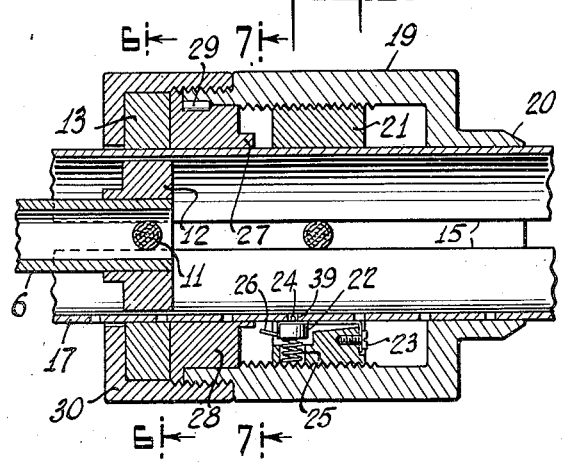
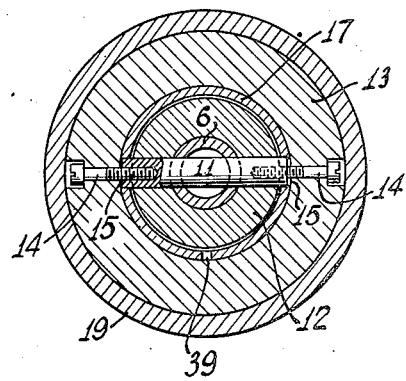
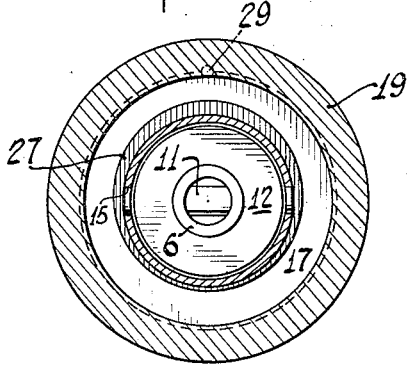
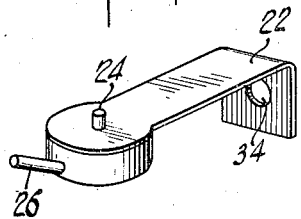
INVENTOR
ORVILLE E. DOW.
BY
ATTORNEY Patented Apr. 15, 1947

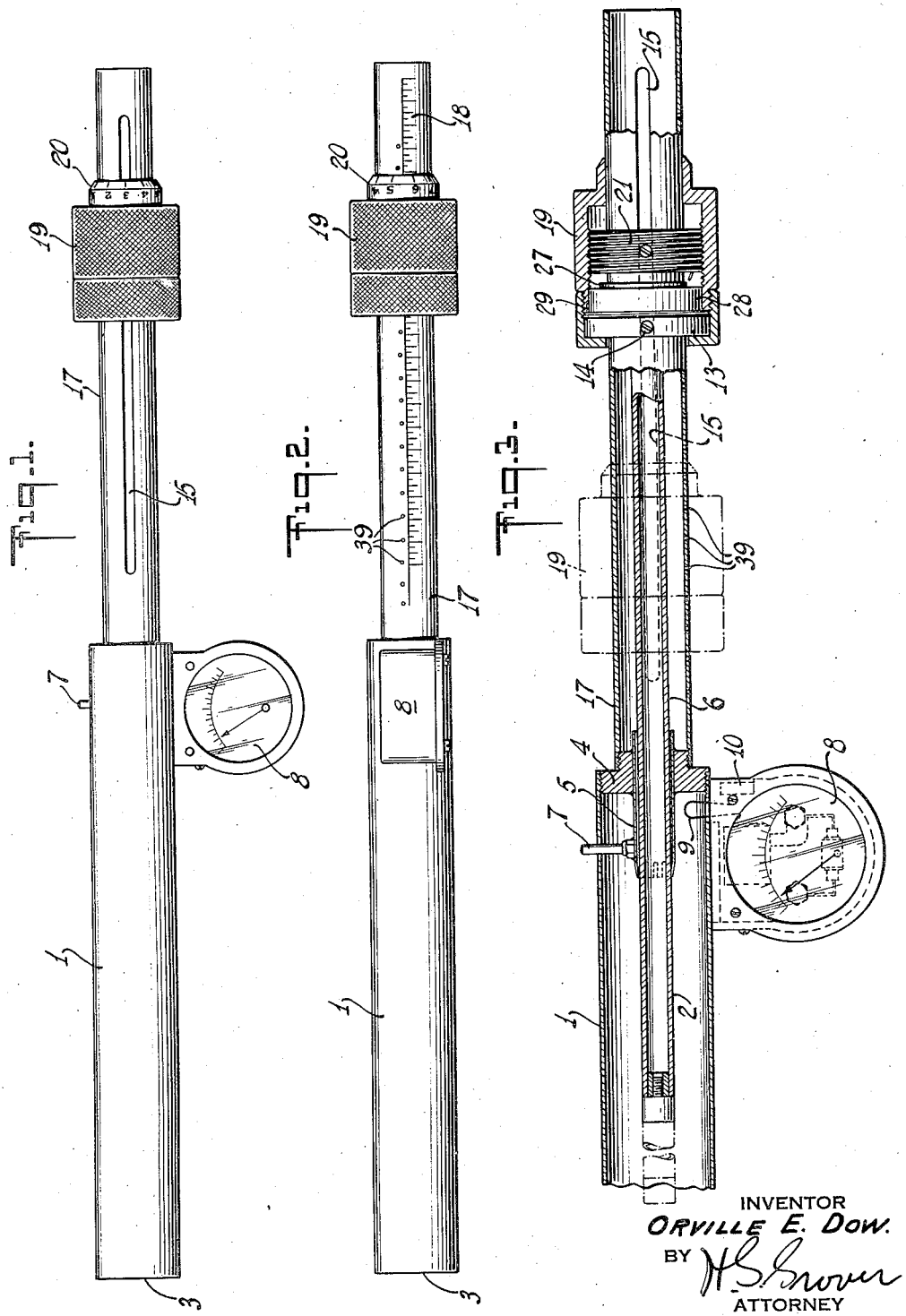

2,419,126

UNITED STATES PATENT OFFICE 2,419,126

HIGH-FREQUENCY WAVEMETER

Orville E. Dow, Port Jefferson, N. Y., assignor to Radio Corporation of America, a corporation of Delaware Application July 25, 1942, Serial No. 452,375

8 Claims. (Cl. 178—44)

This invention relates to improvements in frequency indicators, and particularly to an improved wave-meter for measuring certain characteristics of ultra short waves.

A primary object of the present invention is to provide a compact and portable ultra high frequency wave-meter which has high accuracy and facility of measurement.

Another object is to provide a small and mechanically simplified wave-meter which is equipped with both a rough and a vernier adjusting mechanism for enabling quick and accurate measurements.

A feature of the invention lies in the detent and cooperating spring and eccentric cam mechanism by means of which the vernier is mechanically engaged or disengaged for operative association or disassociation, respectively, with the wave-meter.

The wave-meter of the invention is used to determine the wavelength of the high frequency waves by applying the waves to the inner conductor of an adjustable concentric line resonator whose effective length is adjusted until a condition of resonance obtains. A detector responsive to the waves in the line enables proper adjustment of the length of the line to be effected. This detector is loosely coupled to the line resonator to minimize its effect on the electrical characteristics of the line. The inner conductor of the concentric line resonator is provided with an extension which is surrounded by an outer hollow element used only for mechanical purposes, such as for the adjustment and calibration of the wave-meter. This surrounding outer hollow element is provided with equally spaced calibration holes adjacent a centimeter scale, and these holes serve to accommodate a pin on the external vernier mechanism for limiting the movement of the vernier to a predetermined distance over the scale, which distance exceeds by a small amount the distance between two adjacent holes. This pin forms part of a detent which cooperates with a rotatable eccentric cam for lifting the pin from a hole or for enabling the pin to drop into a hole. The vernier and associated adjusting mechanism are slidable over the hollow element surrounding the extension of the inner conductor. A slot in this hollow element enables a ring on the outside of the hollow element to move the extension of the inner conductor, to thereby adjust the effective length of the inner conductor within the concentric line resonator.

A more detailed description of the invention follows in conjunction with drawings, wherein:

Fig. 1 is a side elevation view of the wave-meter of the invention;

Fig. 2 is a bottom plan view of Fig. 1;

Fig. 3 is a fragmentary view, partly in section and partly in elevation, of the wave-meter of the invention;

Fig. 4 is an exploded fragmentary view of the adjusting mechanism;

Fig. 5 is a cross section of the slidable adjusting mechanism, as assembled;

Fig. 6 is a cross-section of Fig. 5 along the line 6—6;

Fig. 7 is a cross-section of Fig. 5 along the line 7—7; and

Fig. 8 is a perspective view of the detent spring of the vernier.

Throughout the figures of the drawings the same parts are represented by the same reference numerals.

Referring to the drawings, and to Figs. 1, 2 and 3 in particular, there is shown a wave-meter comprising a concentric line resonator having an outer hollow conductor 1 and a tubular inner conductor 2. Concentric conductors 1 and 2 are open at end 3 of the resonator but conductively connected together at their other ends by means of metallic ring 4. The inner conductor is slidable within a metallic sleeve 5 to which it is directly connected by contact, and has an extension 6 extending outside the line resonator. A probe 7, directly connected to the metallic sleeve 5, extends through an aperture in the outer conductor 1. The waves to be measured are collected by probe 7 and excite the resonator for producing an indication in microammeter 8 which is mounted on the outside of the outer conductor 1. The waves set up in the resonant line induce currents in loop 9. These currents are rectified by a suitable galene or silicon detector 10, shown conventionally in box form, and the rectified currents applied to the meter 8.

The effective length of the inner conductor 2 is adjusted by movement of the extension 6 which is located within a hollow member 11. Extension 6 is mechanically linked by means of a stud 11 to a metallic ring 12, the latter in turn being mechanically linked to a surrounding metallic ring 13 by means of screws 14, 14 threadedly engaging the ends of stud 11. (Note Figs. 4 and 6.) Ring 13 is slidable over hollow member 17 in virtue of the slots 15, 15 appearing diametrically opposite each other in the member 17.

Hollow member 17 is provided with a scale 18 and adjacent this scale are a plurality of equally spaced calibration holes 39, 39. Each subdivision of the scale represents one centimeter of wavelength, although the distance between any two subdivisions is only one-quarter of a centimeter in length. This is because the resonant line 1, 2 is electrically one-quarter wavelength long at the frequency for which the line is resonant. Consequently, movement of the inner conductor 2 for a distance equal to a quarter centimeter is equivalent to changing the resonant frequency of the line by a value corresponding to a wavelength of one centimeter. Each long mark on scale 18 represents four centimeters. The calibration holes are spaced apart by distances equal to four subdivisions and are located slightly to the right of the adjacent long markings on the scale. The holes 39 and the scale 18 are shown positioned substantially mid-way between the two slots.

A Duralumin sleeve 19 which is slidable over the hollow member 17 has a vernier scale at 20 divided into ten divisions, each of which represents one-tenth of a centimeter. The sleeve 20 is knurled at its largest diameter portion and screw threaded in its interior to threadedly engage the metallic ring 21. (Note Figs. 3 and 5.)

Ring 21 is also slidable over hollow member 17 and is provided on its inner surface, at a location over an imaginary line connecting the calibration holes, with a slight depression for accommodating a detent spring 22. Detent spring 22 extends through the width of ring 21 and is fastened to ring 21 at one end by a screw 23 which passes through hole 34 in the spring. (Note Figs. 4, 5 and 8.) The other end of detent spring 22 is provided with a pin 24 adapted to be forced into or engage the calibration holes by the force exerted by a small beryllium copper spiral spring 25, and is also provided with a lug 26 which serves to release or disengage the pin 24 from the calibration holes 39.

For disengaging the detent from the calibration holes, there is provided an eccentric cam 27 mounted on a metallic ring 28 also slidable over element 17. (Note Figs. 4, 5 and 7.) When ring 28 is in its assembled position, rotation of this ring will cause the lug 26 on the detent to ride up on the cam 27, thus forcing the detent outwards against the spiral spring 25, as a consequence of which the pin 24 on the detent will slide free of the calibration holes. Ring 28 is also provided with a guide pin 29 adapted to slide into a cooperating aperture in sleeve 19 for assuring proper positioning of the elements in assembling the adjusting mechanism.

Another Duralumin sleeve 30 is provided with screw threads on its interior surface to engage certain threads on sleeve 19, thereby holding together in one compact assemblage all of the rings 13, 28 and 21. This assemblage is thus slidable as a unit over the hollow member 17, the movement of which unit produces a corresponding adjustment of the effective length of the inner conductor 2 in the interior of the concentric line.

The dotted lines on the extension part of the wave-meter in Fig. 3 illustrate, by way of example, one of the positions which the adjusting mechanism may take, and the dotted lines at the open end of inner conductor 2 illustrate the corresponding position of this inner conductor.

In operating the wave-meter, the adjusting mechanism should be rotated until the vernier is disengaged (by having the detent slide freely). By pushing or pulling knurled sleeve 19 over the tuning range, a point will be reached where the meter gives an indication. Such a procedure succeeds in giving an indication which is not extremely accurate. The adjusting mechanism should then be rotated slightly to release the cam 27 from engaging the lug 26 on the detent. The sleeves 30 and 19 should now be moved to the right, to cause the pin 24 of the detent to engage the first calibration hole to be reached. When pin 24 drops into a calibration hole, the vernier should be turned to cause movement of the inner conductor 2 until an indication is again given on the meter. The vernier can be adjusted over a range of approximately one centimeter. This centimeter is calibrated to read four centimeters of wavelength. The wavelength of the waves to be measured is then read from the scale 18 and the vernier 20.

In one embodiment of the invention successfully constructed, the wave-meter was composed entirely of light weight metal and had a range of from 28 to 100 centimeters. It should be understood, however, that the principles of the invention are independent of any particular range of wavelengths since a different wavelength range can be obtained by making the mechanical lengths of the essential elements of the wave-meter longer or shorter.

What is claimed is:

1. An indicating instrument comprising a tuned circuit composed of a pair of parallel conductors electrically connected at one end by a metallic element, one of said conductors and said element being slidable with respect to each other for varying the resonant frequency of said tuned circuit, a member joined to said instrument and carrying a scale and provided with a plurality of equally spaced holes, and adjusting means movable over said scale for varying the electrical length of said tuned circuit, said adjusting means including a vernier for engaging one of said holes, whereby movement of said adjusting means can be limited at the will of the operator to the distance between two adjacent holes.

2. A wave-meter comprising a pair of concentric conductors electrically connected at one end by a metallic ring to form a resonant line, said inner conductor and said ring being adjustable with respect to each other for varying the effective length of said inner conductor, a tubular member joined to said one end of said concentric conductors and carrying a scale, said tubular member being provided with a plurality of equally spaced calibration holes adjacent said scale, and adjusting means movable over said scale for varying the electrical length of said tuned circuit, said adjusting means including a vernier for engaging one of said holes, whereby movement of said adjusting means can be limited at the will of the operator to the distance between two adjacent holes.

3. A wave-meter comprising a concentric line, a stationary metallic ring closing one end of said line to form a resonant circuit, said inner conductor being slidable within said ring, an extension of said inner conductor outside said resonant circuit for enabling adjustment of the effective length of said inner conductor, a tubular member fastened to said ring and surrounding said extension, said member carrying a scale and being provided with a plurality of equally spaced calibration holes adjacent said scale, adjusting mechanism comprising an element surrounding said tubular member, movable thereover, and linked to said extension, said element including a detent having a pin for dropping into one of said holes, whereby movement of said adjusting mechanism is thereby limited to the distance between two adjacent holes, and means for freeing said pin from the hole into which it is dropped.

4. A wave-meter comprising a concentric line, a stationary metallic ring closing one end of said line to form a resonant circuit, said inner conductor being slidable within said ring, an extension of said inner conductor outside said resonant circuit for enabling adjustment of the effective length of said inner conductor, a tubular member fastened to said ring and surrounding said extension, said member carrying a scale and being provided with a plurality of equally spaced calibration holes adjacent said scale, adjusting mechanism comprising an element surrounding said tubular member, movable thereover, and linked to said extension, said element including a detent having a pin for dropping into one of said holes, whereby movement of said adjusting mechanism is thereby limited to the distance between two adjacent holes, and a rotatable eccentric cam adapted in one position to engage said detent for freeing said pin from the hole in which it is dropped and adapted in another position to disengage said detent to permit said pin to drop into a hole.

5. A wave meter assemblage comprising a hollow cylindrical conductor, a short-circuiting member located intermediate the ends of said assemblage and including a sleeve, a tuning rod slidably mounted within said sleeve and located within said hollow cylindrical member, means for varying the effective length of said tuning rod comprising an extension of said rod on the side of said sleeve opposite to that on which said rod appears and a rotatable element affixed to said rod and movable therewith along its axis, a scale member over which said rotatable element is adapted to move, said scale member having a plurality of equally spaced calibration holes, vernier mechanism mechanically linked to said rotatable element and being rotatable and movable therewith along said axis, said vernier including a detent having a pin for dropping into one of said holes whereby longitudinal movement of said vernier mechanism and said rotatable element is limited to the distance between two adjacent holes, said vernier also including an eccentric cam for disengaging said pin from said holes, thereby permitting axial movement of said rotatable element and vernier over the entire range of said scale.

6. A wave-meter assemblage comprising a hollow cylindrical conductor, a stationary short circuiting member located intermediate the ends of said assemblage and including a stationary sleeve, a tuning rod slidably mounted within said sleeve and located within said hollow cylindrical member, said short circuiting member electrically connecting said hollow conductor and tuning rod together, an extension of said rod on the side of said sleeve opposite to that on which said rod appears, a scale adjacent said extension, and adjusting mechanism affixed to said extension for varying the effective length of said rod, said adjusting mechanism including a ring-like vernier located externally of said extension and movable longitudinally on said assemblage, said vernier having means for restricting movement of said extension over a small unit of measurement on said scale anywhere along said scale.

7. A wave-meter comprising a concentric line resonator having a tunable inner conductor, tuning mechanism including a vernier at one end of said line resonator for restricting longitudinal movement of said inner conductor between relatively small limits of adjustment over any desired portion of the tuning range, said tuning mechanism including a rod affixed to one end of the tunable inner conductor, a stationary tubular element surrounding said rod, a ring secured to said rod for moving the same, said ring surrounding a small portion of said tubular element, a movement limiting pin carried by said ring and adapted to engage said tubular element at desired predetermined points, and a cam for disengaging said pin from said tubular element.

8. A wave-meter comprising a concentric line, a stationary metallic ring closing one end of said line to form a resonant circuit, said inner conductor being slidable within said ring, an extension of said inner conductor outside said resonant circuit for enabling adjustment of the effective length of said inner conductor, a tubular member fastened to said ring and surrounding said extension, said member carrying a scale and being provided with a plurality of equally spaced calibration holes adjacent said scale, adjusting mechanism comprising an element surrounding said tubular member, movable thereover and linked to said extension, said element including a detent having a pin for dropping into one of said holes, whereby movement of said adjusting mechanism is thereby limited to the distance between two adjacent holes, said detent being mounted on the interior surface of said element, a spring in said element exerting pressure on said detent against said tubular member, and a rotatable eccentric cam adapted in one position to engage said detent for freeing said pin from the hole into which it is dropped and adapted in another position to disengage said detent to permit said pin to drop into a hole.

ORVILLE E. DOW.

REFERENCES CITED

The following references are of record in the file of this patent:

UNITED STATES PATENTS

| Number | Name | Date |
| --- | --- | --- |
| 2,106,713 | Bowen | Feb. 1, 1938 |
| 2,086,615 | Grundmann | July 13, 1937 |
| 1,656,927 | Wheelock | Jan. 24, 1928 |
| 1,853,134 | Muschker | April 12, 1932 |
| 1,943,638 | Swanson | Jan. 16, 1934 |
| 2,245,138 | Zottu | June 10, 1941 |